Aug. 6, 1957     W. W. GARVIN ET AL     2,801,794
APPARATUS FOR GEOPHYSICAL PROSPECTING Filed March 1, 1951                              6 Sheets—Sheet 1

INVENTORS
WALTER W. GARVIN
JASPER R. LEGGETT
BY
ATTORNEYS

Aug. 6, 1957 W. W. GARVIN ET AL 2,801,794
APPARATUS FOR GEOPHYSICAL PROSPECTING
Filed March 1, 1951 6 Sheets-Sheet 2

INVENTORS
WALTER W. GARVIN
JASPER R. LEGGETT
BY *A. L. Snow*
*Ralph L. Freeland, Jr.*
ATTORNEYS Aug. 6, 1957 W. W. GARVIN ET AL 2,801,794
APPARATUS FOR GEOPHYSICAL PROSPECTING
Filed March 1, 1951 6 Sheets-Sheet 3

FIG. 6

INVENTORS
WALTER W. GARVIN
JASPER R. LEGGETT
BY *A. L. Snow*
*Ralph L. Freeland, Jr.*
ATTORNEYS Aug. 6, 1957     W. W. GARVIN ET AL     2,801,794
APPARATUS FOR GEOPHYSICAL PROSPECTING
Filed March 1, 1951     6 Sheets-Sheet 4

INVENTORS
*WALTER W. GARVIN*
*JASPER R. LEGGETT*
BY
ATTORNEYS

Aug. 6, 1957 W. W. GARVIN ET AL 2,801,794
APPARATUS FOR GEOPHYSICAL PROSPECTING
Filed March 1, 1951 6 Sheets-Sheet 5

INVENTORS
WALTER W. GARVIN
JASPER R. LEGGETT
BY
ATTORNEYS

FIG. 11

INVENTORS
WALTER W. GARVIN
JASPER R. LEGGETT

United States Patent Office

2,801,794
Patented Aug. 6, 1957

2,801,794

APPARATUS FOR GEOPHYSICAL PROSPECTING

Walter W. Garvin, Whittier, and Jasper R. Leggett, Los Angeles, Calif., assignors to California Research Corporation, San Francisco, Calif., a corporation of Delaware Application March 1, 1951, Serial No. 213,404

6 Claims. (Cl. 235—61)

The present invention relates to a method of geophysical prospecting and more particularly relates to a method and apparatus for determining the vertical component of gravity at any desired point in the vicinity of a known geological anomaly.

It has long been appreciated that it would be extremely desirable to be able to accurately and rapidly evaluate the effect of a geological anomaly of known density and dimensions in the interpretation of gravitational surveying information in geopyhsical exploration.

In the interpretation of gravitational surveying information, it is customary to employ a contour map developed from a plurality of mapping points arranged in a coordinate system. However, in the vicinity of a geological anomaly or unconformity of lighter or greater density, it has been assumed that the contour map constructed by the usual isoanomalic lines are due entirely to the mass configuration of the anomaly. Since the anomalies which occur in nature rarely if ever have a regular configuration, there is a distinct possibility that any contour map may be affected by minor or unpredictable gravitational anomalies in the same general area. Where one anomaly has been well-defined by drilling, the size and shape, as well as the density distribution, are generally known, and from this information the gravitational field due to the known anomaly may be determined. However, in actual practice this has been rarely, if ever, attempted due to the complexity of the mathematical problem involved in determining the vertical component of gravity for even a few particular points at the earth's surface in the vicinity of the anomaly. Accordingly, while it has been appreciated that other adjacent anomalies, such as a very deep-seated salt dome, or other comparable structure, may affect the gravity contour map of the area, there has been no practical means for determining the existence of such a structure without actual exploratory drilling.

It is therefore an object of the present invention to provide a method of geophysical surveying which makes it possible to rapidly and accurately determine the vertical component of gravity for any desired point due to an arbitrary three-dimensional mass distribution.

It is a further object of the invention to provide a method and apparatus for determining the presence of anomalies and unconformities in geological structure in the vicinity of an anomaly of known dimensions and density.

It is another object of the invention to provide a method of interpretation of gravitational surveying information to permit the comparison of the gravitational effect of an anomaly of known dimensions with a gravitational field map obtained by normal gravity surveying operations.

In general, the present invention is directed to a method and apparatus for geophysical surveying by establishing a plurality of mapping points arranged in a coordinate system in the vicinity of a geological anomaly having known dimensions and density, dividing the known anomaly into a finite number of prisms, generating an alternating current potential of a controlled frequency, applying said potential across a plurality of impedance networks which include resistances and reactances of preselected values corresponding to known horizontal and vertical components of distances between one of the mapping points at which the vertical component of gravity is to be determined and each of said prisms, detecting the current flow in each of the impedance networks and measuring the total current of all said networks at a position on said coordinate system corresponding to said mapping point and then comparing the theoretical vertical component of gravity to the field measured vertical component of gravity.

Further objects and advantages of the present invention will become apparent from the following detailed description taken in conjunction with the accompanying drawings which form an integral part of this application.

Figure 1:
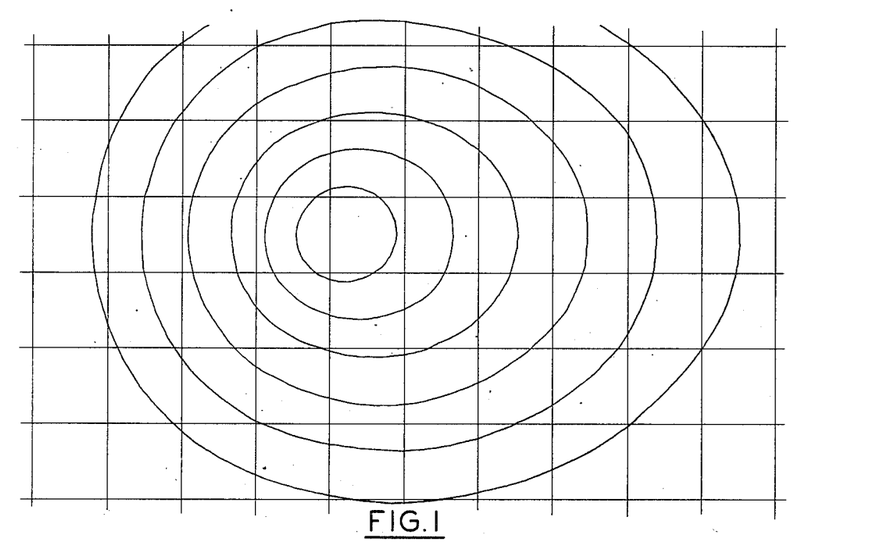
Fig. 1 is a schematic representation of a typical contour map obtained by conventional gravity meter or torsion balance methods of geophysical surveying.
Figure 2:
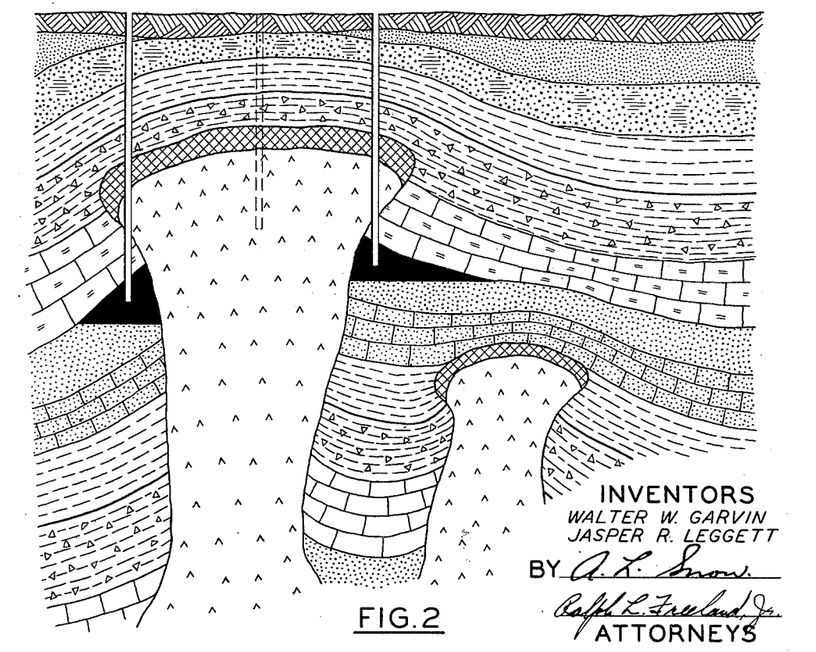
Fig. 2 is a cross section of a salt dome formation of dimensions and density capable of producing a contour map as illustrated in Fig. 1.

Referring now to the drawings, and in particular to Figs. 1 and 2, there is shown a typical gravity contour map constructed in the usual manner from information developed by gravitational surveying by either a gravity meter or a torsion balance means. The type of contour map shown in Fig. 1 is generally developed by the taking of gravity measurements at pre-determined spaced intervals or stations in a coordinate system. It will be understood that this type of contour map is usually made after each station or mapping point in the coordinate system has been corrected to a starting or datum plane so that the contour lines represent equi-potential planes over the area surveyed.

As shown in Fig. 2, the contour map of Fig. 1 may be influenced by the presence of two similar salt domes of the type encountered in the Gulf Coast region where the use of gravitational surveying methods has been particularly successful. It will be understood, of course, that the effect on the gravitational forces at the earth's surface due to a salt dome is generally to reduce the gravitational attraction in the vicinity of the salt dome. For this reason, the equipotential lines represent relative decreases in gravitational attraction as the center of the dome is approached. However, in those salt domes where oil has been found, there is generally associated with the dome a cap rock of greater density than salt and frequently even greater density than the surrounding sedimentary formations. For this reason, the contour lines directly over the central portion of the dome will generally be of higher or greater attractive force than the contour lines immediately around the center closure. While the contour lines in Fig. 1 are shown to be deflected towards the right due to the presence of the smaller salt dome at the righthand side of the larger dome, it will be appreciated by those skilled in the art that the lack of symmetry of the contour lines directly over the larger dome may be due to the irregularities of the larger dome itself, such as by a protruding nose formation on the upper flank of the larger dome, or by other types of unconformities or anomalies in the sub-surface geology. It is generally understood that mere inspection of the contour map presents an indeterminate problem as to the exact anomaly beneath the surface producing that particular contour.

In view of the difficulty in predicting the exact nature of the sub-surface formation by inspection of the gravity contour map, it has long been appreciated that some means of evaluating the effect of a particular, known anomaly on the map obtained by surveying methods would provide an extremely useful tool in predicting the presence of additional structures favorable for the accumulation of oil or other ore deposits or definitely establishing the absence of any other structure in the same geographical vicinity. For example, as illustrated in Fig. 2, the larger salt dome is shown to have been productive of oil and hence the outlines, dimensions and density of the salt in the vicinity of the dome have been well denfied by actual drilling operations. However, where a three-dimensional mass, such as the larger dome, produces a contour such as that shown in Fig. 1, the only means for detecting the presence of the smaller dome prior to this invention has been by actual drilling practices representing a large investment in time and materials. While theoretical methods of calculating the effect of the larger dome have been described in the literature, the time and expense in obtaining the effect by conventional mathematical methods has made this alternative less attractive than the actual drilling of potentially favorable areas. This is primarily due to the fact that even when a favorable structure can be predicted in the vicinity of a known anomaly, it is still necessary to actually drill to determine the presence of oil, gas or other minerals.

In addition to the possibility of determining the exact dimensions of a known anomaly by drilling, it will be well understood by those skilled in the art that the dimensions of a particular anomaly may also be determined by seismograph work, either alone or in combination, with actual exploration, where the overlying surface is favorable for such surveying methods. In addition it will be become apparent that by employing the method of the invention described herein, an improvement in gravitational surveying may be obtained in the vicinity of a known anomaly so that it is possible to evaluate any gravity contour map whether or not the contour suggests the possibility of additional anomalies.

Figures 3, 5:
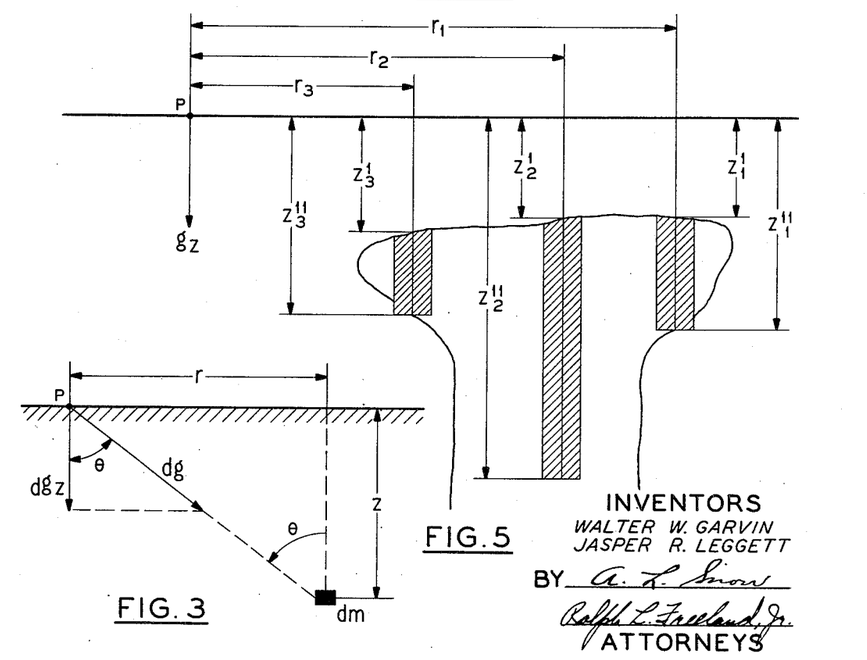
Fig. 3 is a schematic representation of the gravitational attraction at a point $p$ of a point mass $dm$ buried below a datum plane at a horizontal distance $r$ and a depth $z$.
Fig. 5 is a schematic representation of a method of resolving the vertical components of the anomaly represented in Fig. 4.

Since the gravity contour map such as that shown in Fig. 1, when produced from conventional gravity meter readings, represents the vertical component of gravity at any point on the isoanomalic lines, it will be apparent that a map as modified by a known anomaly, should likewise be expressed in terms of the vertical component of gravity. Accordingly, the vertical component of gravity due to an arbitrary three-dimensional mass distribution below a give plane may be theoretically evaluated in the following manner: As shown in Fig. 3, consider a point mass of volume $dM = dxdydz$ at a depth $z$ below the surface. The density of the point mass may be denoted by $\rho$. The gravitational fiield at an arbitrary mapping point P will then be given by:

$$dg_P = \frac{\gamma dm}{r^2 + z^2} = \frac{\gamma \rho dx dy dz}{r^2 + z^2}$$

where $\gamma$ is the gravitational constant. The direction of the field is along the line joining P and the point mass. The vertical component of the field can then be expressed as:

$$dg_{zP} = dg_P \cos \theta = \frac{\gamma \rho \cos \theta dx dy dz}{r^2 + z^2}$$

However:

$$\cos \theta = \frac{z}{\sqrt{r^2 + z^2}}$$

so that:

$$dg_{zP} = \frac{\gamma \rho z dx dy dz}{(r^2 + z^2)^{3/2}}$$

If this expression is now integrated from $z = z_1$ to $z = z_2$, the result will represent the vertical component of the gravitational field of an elementary prism of cross-sectional area $dxdy$ whose top and bottom are at depths $z_1$ and $z_2$ respectively.

Performing the integration, we obtain:

$$dg_{zP} = \gamma \rho \left( \frac{1}{\sqrt{r^2 + z_1^2}} - \frac{1}{\sqrt{r^2 + z_2^2}} \right) dx dy$$

Figure 4:
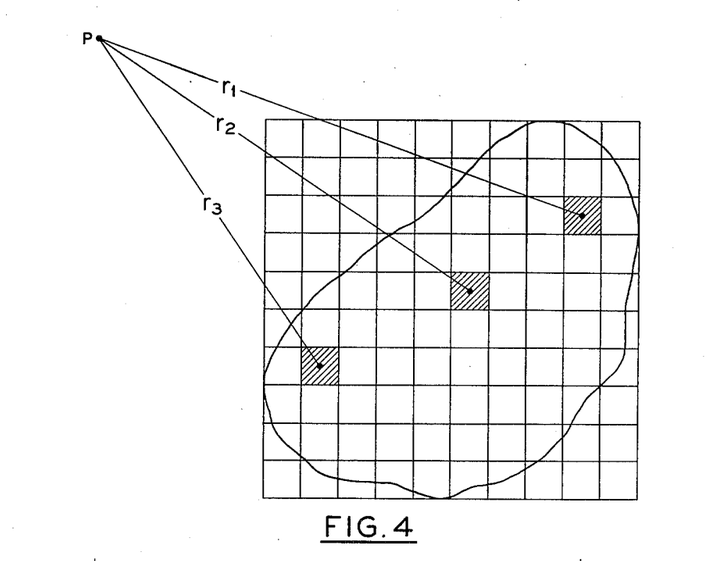
Fig. 4 is a schematic representation of a method by which a gravitational anomaly may be analyzed with respect to horizontal distances from a given mapping point to individual elements of the anomaly in accordance with the present invention.

We may consider a given mass distribution to be built up of a totality of such elementary prisms as those shown in Fig. 4. The total vertical component of gravity at the point P will be the sum of the contributions of the elementary prism out of which the mass distribution is composed, and we can therefore write:

$$g_{zP} = \gamma \rho \int \int \left[ \frac{1}{\sqrt{r^2 + z_1^2}} - \frac{1}{\sqrt{r^2 + z_2^2}} \right] dx dy \quad (1)$$

where we have assumed a constant density throughout the volume. The integration is to be carried out over the limits of the mass configuration.

Denote the coordinates of the point P by $x_0$ and $y_0$ (there is no loss of generality in assuming P to be in the plane $z = 0$). Then:

$$r^2 = (x - x_0)^2 + (y - y_0)^2$$

so that (1) becomes $$g_{zP} = \gamma \rho \int \int \left[ \frac{1}{\sqrt{(x-x_0)^2 + (y-y_0)^2 + z_1^2(x,y)}} - \frac{1}{\sqrt{(x-x_0)^2 + (y-y_0)^2 + z_2^2(x,y)}} \right] dx dy \quad (2)$$

where we have indicated the implicit dependence of $z_1$ and $z_2$ on $x$ and $y$. We note that $z_1$ and $z_2$ depend only on the shape of the mass distribution and are independent of the coordinates of the point at which $g_z$ is to be computed. The quantity $r$, on the other hand, depends only on the coordinates of the point of observation and is independent of the shape of the anomalous mass.

It will be readily appreciated that the above integral may be evaluated exactly for certain simple geometrical shapes. However, in the more general case where the shape is complex, the evaluation of this integral as a practical matter has been too tedious and time consuming to justify a numerical solution. For this reason, there has long been a desire for a simple method and apparatus capable of evaluating a problem of this type.

It has been proposed in the prior art to split a known structure into several horizontal prisms of infinite lateral dimensions. This method is described in "Exploration Geophysics," by J. J. Jakosky, 2nd edition, 1950, on page 359 et seq., but as there explained, the solution of the problem in such a manner is so difficult, as a practical matter, that little or no use has been made of the method. However, we have found that by dividing the mass distribution into a plurality of vertically disposed, similar prisms, that it is possible to represent the above-mentioned integration as a summation in which the differential cross-section, $dA$, of such elementary prism, $dxdy$ is equal to the incremental cross-sectional area $\Delta A$. If, then, it is assumed that the mass is represented by $n$ prisms, then the total effect of all prisms $N$ may be expressed by $$g_{zP} = \gamma \rho \Delta A \left( \sum_{n=1}^{N} \frac{1}{\sqrt{r_{np}^2 + z_{n1}^2}} - \sum_{n=1}^{N} \frac{1}{\sqrt{r_{np}^2 + z_{n2}^2}} \right)$$

This equation is best illustrated by Figs. 4 and 5 in which a three-dimensional anomaly has been positioned within a square having a cross-section of 10 units on each side, or a total of 100. It will be appreciated from an analysis of these figures with respect to the above-mentioned summation that where the anomaly may be represented by approximately 70 prisms as shown in Fig. 4, it would be necessary to evaluate numerically the effect of each prism for each point P for which the vertical component of gravity is to be determined. In view of this time-consuming operation, if performed numerically, the problem would be unsolvable as a practical matter.

We have found that the terms of the above-mentioned summation may be solved by electrical methods employing an electrical computing circuit in which the terms of the square root of the sum of the squares of two numbers may be expressed by a series circuit having resistances and reactances therein. This may be accomplished by the utilization of an alternating current potential having a peak amplitude V and a known frequency $f$. This may be expressed as $$I = \frac{V}{\sqrt{R^2 + X^2}}$$

where:

$R$ = horizontal distance, and $X$ = vertical distance.

Figure 6:
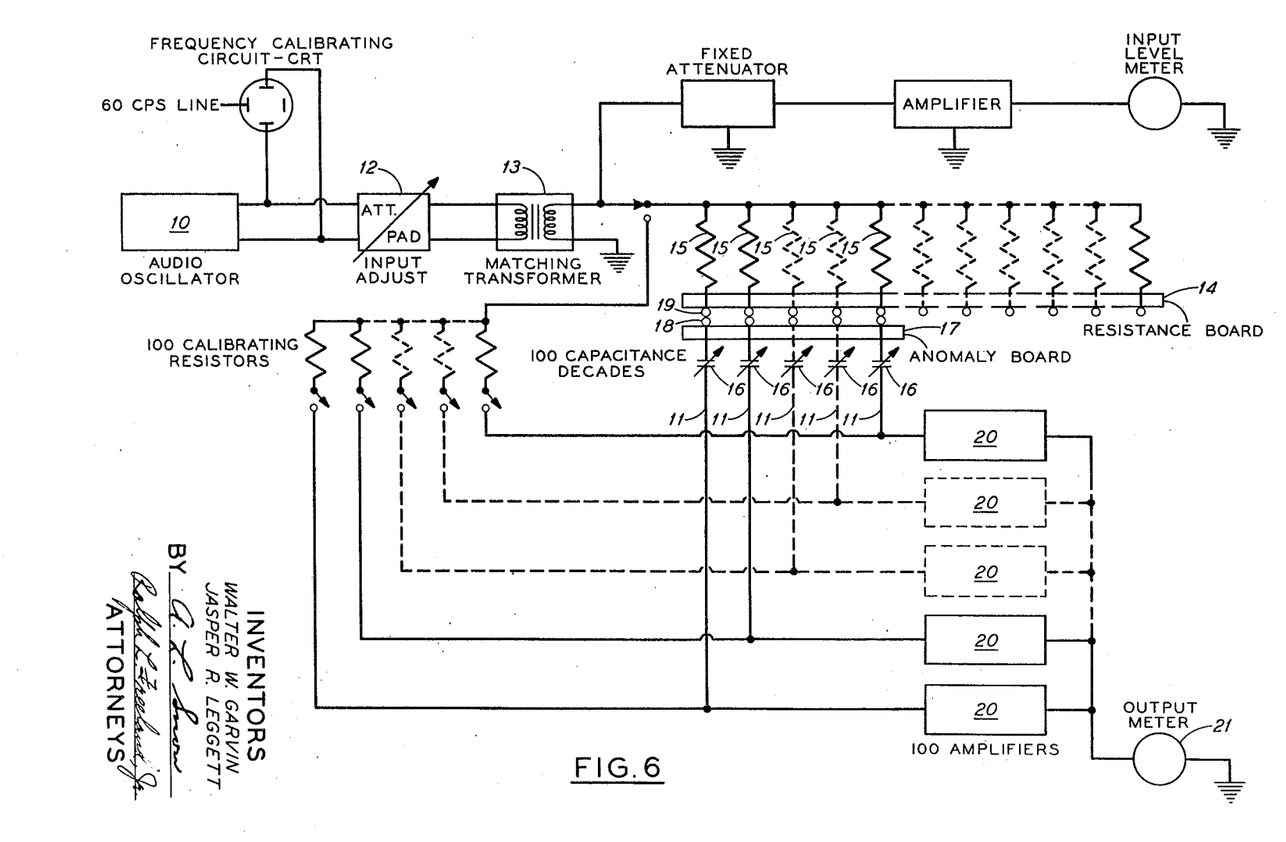
Fig. 6 is an elementary diagram of the preferred embodiment of an analog-computing circuit arrangement for determining the vertical component of gravity at a predetermined mapping point produced by a known geological anomaly.

The reactance X may be supplied in this circuit either by a capacitance C or an inductance L. In the preferred embodiment, the reactance is supplied by means of condensers, the values of which are controlled by the well-known formula, $$X = \frac{1}{2\pi f C}$$

where:

$X$ = reactance in ohms
$f$ = frequency in cycles/sec.
$C$ = capacitance in farads For the purpose of performing the summation of a plurality of similar terms by this network, it is desirable to detect the current flow in each impedance branch and independently add the total current in each branch so that the total current in all branches may be indicated by a suitable current-sensitive means such as an ammeter or voltmeter. A preferred embodiment of the computing circuit which provides the desired isolation of each impedance branch is shown in Fig. 6. As there shown, an alternating current source, such as an audio oscillator 10, is connected to a plurality of branched impedance circuits 11 through an attenuator pad 12 and a matching transformer 13 which are adapted to match the impedances of the oscillator and branched circuits. The potential source is then connected to the common side of a resistor board 14, to be described more fully hereinafter, which is so constructed that the value of each of the plurality of resistances 15 is proportional to its distance from a predetermined point on the resistor board. To increase the flexibility of the measuring circuit, a plurality of condensers 16 preferably serve as the reactance element in each of the impedance circuits 11. In the present embodiment there are 100 variable capacitances which may be of the decade type, providing 99 substantially equal steps. These condensers may be connected in series with any desired adjacent 100 resistances by contact pins 18 on a movable anomaly board 17. Anomaly board 17 is adapted to move with respect to the resistance board 14 which is provided with contact pins 19 connected to resistors 15 and spaced apart in the same manner as pins 18 on anomaly board 17. By holding resistance board 14 in a stationary position, pins 18 on anomaly board 17 are adapted to contact the desired resistors 15 through contact pins 19.

For the purpose of isolating each of the impedance branches 11, an amplifier, designated generally as 20, is directly coupled to the opposite terminal of the condenser 16. Amplifiers 20 are of conventional design, and adapted to amplify and recitfy the input signal from each network 11 associated therewith. The output side of each of amplifiers 20 may in turn be connected in circuit with an output meter 21 as shown in Fig. 6, to permit the indication of the total current flow in all of the impedance branches.

It will be apparent that the total current flow, as indicated by output meter 21 may be calibrated in terms of gravitational units corresponding to the vertical components of gravity. In this way, the coordinate points in the vicinity of the known anomaly may be evaluated and compared with the gravitational contour map obtained by geophysical surveying methods. As an additional step, the vertical gravity values obtained by field surveying methods may be adjusted by the addition or subtraction of the vertical components obtained by the operation of the computing network and a residual gravity contour map prepared therefrom to indicate the location of geological anomalies in the vicinity of an anomaly of known mass and dimensions. For example, the contour map in Fig. 1 may be modified by algebraically subtracting the values obtained for the larger anomaly from the field-measured values. Since the gravitational anomaly shown in Fig. 1 is mainly due to the large salt dome as shown in Fig. 2, and produces a contour indicating less density than the surrounding media, the step of algebraically subtracting the vertical gravity values obtained in the field in effect eliminates the contour due to the larger dome. The residual gravity values may then be contoured. This will result in a contour map produced solely by the smaller dome.

Figure 7:
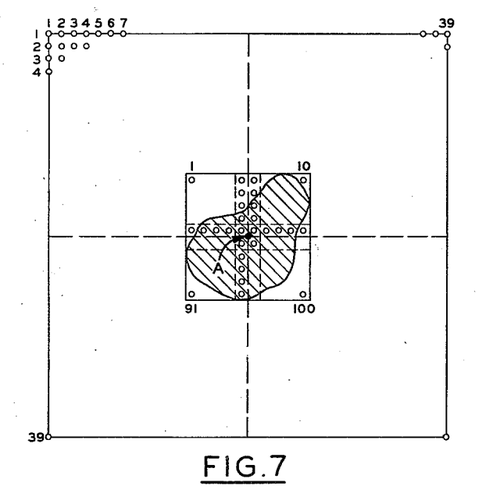
Fig. 7 is a schematic representation of one form of the resistor board utilized in representing the horizontal distances from elements of a geological anomaly to a pre-determined mapping point, as well as contact means for connecting a plurality of resistances in series with the desired reactances of the analogous circuit.

In the construction of both the mechanical and electrical counterparts of the horizontal and vertical distances from the mapping point to each elemental prism of a known mass, it has been found to be equally satisfactory to represent either vertical distances or horizontal distances as reactances. However, in the commercial embodiment the horizontal distances are represented as resistances while the vertical distances are represented as reactances for reasons which will become apparent hereinafter. As shown in Fig. 7, the anomaly is preferably represented by the so-called anomaly board 17, which in actual function operates only as a multiple contact arrangement by means of contacts 18. In the present embodiment, the anomaly board is provided with 100 contacts 18 arranged in a 10 x 10 square so that individual connections may be made with a maximum of 100 resistances. In mechanical form, the anomaly board comprises 100 spring-loaded contact points 18 mounted on an insulating board with inter-connecting wires for each contact point. In this way, the anomaly board provides the inter-connection between any 100 adjacent resistors and 100 condensers whose values are varied in accordance with the vertical depth from a reference, or datum plane, to the top of each elementary prism of the anomaly.

Since in general it is desirable to provide a coordinate system of mapping points in the datum plane, the horizontal distances from the mapping point to the axis of each elemental prism is preferably represented by a resistance whose value is adjusted in accordance with the horizontal distance. In the arrangement shown in Fig. 7, this is accomplished by establishing a single mapping point A on the stationary resistor board in the center of a configuration comprising 1,521 resistors arranged in a 39 x 39 square. As explained hereinafter, these dimensions permit a total of 900 mapping points. It will be noted that mapping point A is positioned in the middle of the resistor board, thereby causing point A to fall at a position exactly in the middle of four resistors as discussed above. An advantage of this position for point A lies in the fact that it is unnecessary to provide a zero resistance. In the present arrangement, each of the 1,521 resistors represented by the circles in Fig. 7 is assigned a value corresponding to the horizontal distance between that point on the resistor board and point A, as described below. By operation of the anomaly board over the 39 x 39 square segment of the resistor board, it is possible to successively obtain current values from the output meter of the computer circuit corresponding to movements of the mapping point A. By the arrangement shown in Fig. 7, it is possible to evaluate the vertical component of gravity for 900 separate mapping points disposed symetrically about the axis of a point on the known anomaly.

In the preferred embodiment the distance between mapping points is equivalent to 500 ohms. Thus, the four resistors immediately surrounding a mapping point will have resistances of 354 ohms ($250\sqrt{2}$), the next eight resistors are $250\sqrt{10}$, or 791 ohms, and the four corners of the 4 x 4 arrangement $750\sqrt{2}$, or 1060 ohms. The vertical distance from the reference or datum plane to the top of an element of the anomaly may be controlled by adjusting the amount of reactance. This may be accomplished in the present embodiment by choosing a particular reactance in the condenser decade which approximates the desired reactance. In order that the range of this embodiment may be used to the maximum advantage, the frequency of the A. C. may be adjusted so that maximum reactance desired is equal to the maximum available reactance. In the preferred embodiment, the maximum reactance available is 9,900 ohms at 1,000 C. P. S.

Figure 8:
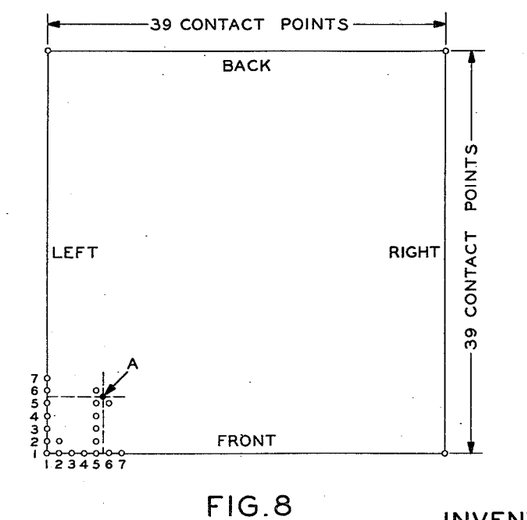
Fig. 8 is a preferred atrrangement of the resistor board shown in Fig. 7.

While the arrangement in Fig. 7 is satisfactory for most problems, we have found that the effective mapping area may be increased by a resistor board of the same size and number of resistors by locating mapping point A as shown in Fig. 8. In this arrangement, mapping point A lies directly under the center of the anomaly board when positioned in the lower left-hand corner of the resistor board as illustrated in Fig. 8. By the addition of means for rotating the anomaly board about its own center point as well as moving it from side to side and up and down, as contemplated in the embodiment shown in Fig. 7, it is possible to almost quadruple the mapping area which may be evaluated by the same resistor board arrangement. Accordingly, it is possible to determine the vertical component of gravity for 3,481 separate mapping points in the vicinity of a known anomaly.

Figure 9:
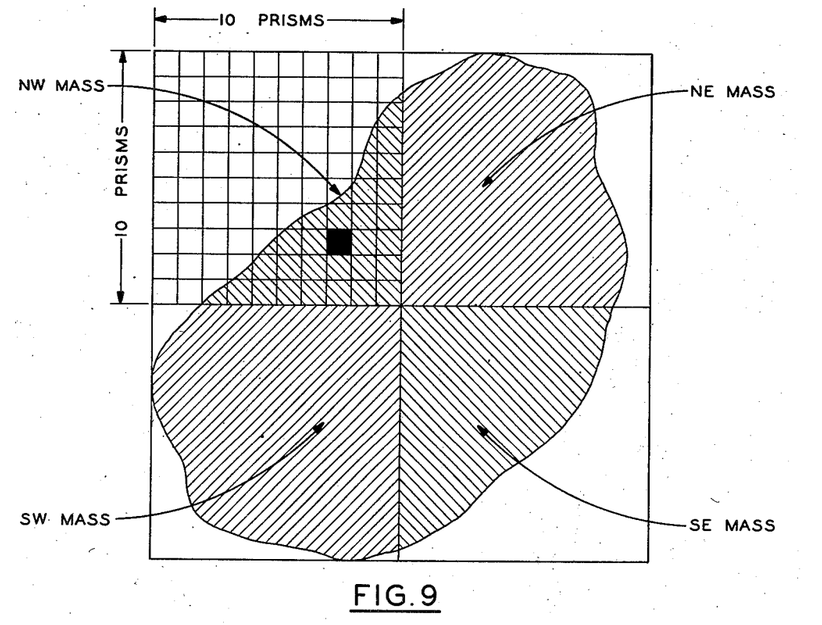
Fig. 9 is a schematic representation in greater detail of an alternative method of handling an anomaly such as that shown in Fig. 4.
Figure 10:
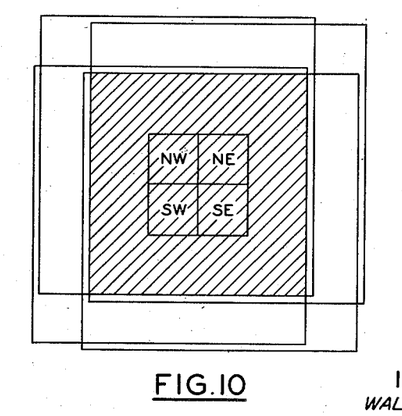
Fig. 10 is a representation of a method of increasing the total mapping area which may be obtained by the resistor board without increase in size of said board.

A still further method of expanding the accuracy and utility of the resistor board and anomaly board arrangement without increasing the numerical number of resistances or the physical size of the boards is illustrated in Figs. 9 and 10. As particularly shown in Fig. 9, a known anomaly may be divided into quadrants so that single quadrants of an anomalous mass may be sucessively investigated. This permits the anomaly to be broken up into a total of 400 prisms as compared to the previous 100 prisms since the entire area of the anomaly board may be employed for each quadrant. This permits a more detailed analysis of the known anomaly. However, when the anomaly is so divided, each gravity value obtained for a particular mapping point representing only the vertical components of gravity for a single quadrant of the anomaly. Accordingly, four successive determinations must be made in order to obtain the exact total field for the complete anomaly. As illustrated in Fig. 10, the total number of mapping points that may be determined in this way is reduced to a total of 2401 due to the fact that only so much of an area in which each of the four quadrants may be determined and added together can the true vertical components of gravity be obtained. Obviously, this same method of enlarging the number of prisms into which the anomaly may be divided can be expanded to any desired limit.

It will be appreciated by those skilled in the art that the resistance elements of the computing network provided by the anomaly and resistor boards may be replaced with adjustable units. It will also be appreciated that while the mapping points have been shown as a rectangular system, the resistor and anomaly boards may be laid out in a hexagonal pattern or other geometrical form without departing from the invention.

Figure 11:
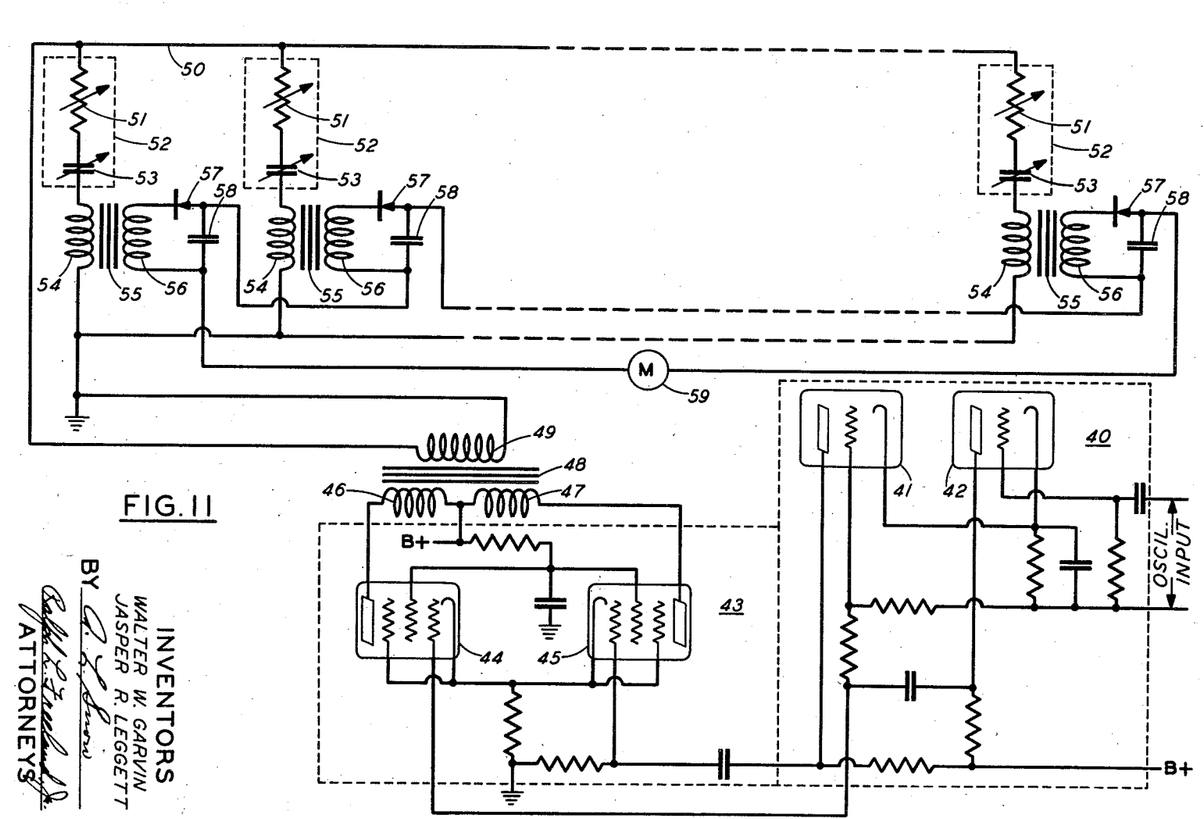
Fig. 11 is an alternative arrangement of the analog computing circuit shown in Fig. 6.

Reference is now made to Fig. 11 wherein there is shown an alternative arrangement for obtaining the summation of the total current flowing in each of the impedance branches. In this arrangement, the alternating current supply is provided by an oscillator (not shown) whose input is connected to a phase inverter designated generally as 40 which is of conventional design and includes a pair of triodes 41 and 42. The output of phase inverter 40 is coupled to a voltage regulator 43 which is provided to insure a substantially constant input voltage irrespective of the current flow in the impedance branches. Voltage regulator 43 includes a pair of amplifying stages 44 and 45 connected in push-pull to primaries 46 and 47 of transformer 48. Secondary 49 of transformer 48 is connected between ground and line 50. Line 50 is connected in common to one side of each of the adjustable resistors 51 in the impedance branches 52. The opposite side of each resistance 51 is connected in series with a corresponding reactance represented by variable condensers 53. The output current from each branch circuit 52 is applied across the primary 54 of an output transformer 55. The secondaries 56 of transformers 55 have connected in series therewith a rectifier 57 and a condenser 58 so arranged that condenser 58 may be charged to a peak potential proportional to the current amplitude in primary 54 of transformer 55. The total current in all of the impedance branches 52 may then be measured by connecting a vacuum tube voltmeter, indicated as meter 59 in series with all of the peak charging condensers 58.

From the foregoing description of the method and apparatus for investigating the horizontal distribution of the vertical component of gravity due to a known anomaly, it is apparent that the present invention provides a method and means for detecting the presence of obscured geological anomalies which could not otherwise be detected when in the vicinity of known anomalies.

Furthermore, by the practice of the present invention a method has been provided for determining the correlation between the horizontal distribution of the vertical component of gravity as determined by field measurements and the effect produced by a gravitational anomaly of known density and dimensions. This correlation permits the location of favorable structures for the accumulation of oil, gas and other minerals which could not otherwise be predicted without exploratory drilling or excavation.

By virtue of the present invention a method of geophysical exploration is provided which will permit the rapid and accurate determination of the location of secondary gravitational anomalies in the vicinity of known gravitational anomalies, where said secondary anomalies have heretofore been undetectable by previously known methods and apparatus.

While numerous modifications and changes in the method and apparatus disclosed herein will occur to those skilled in the art, all such modifications and changes as fall within the scope of the appended claims are intended to be embraced thereby.

We claim:

1. Apparatus for computing the vertical component of gravity at a given point in a horizontal plane comprising a source of controlled frequency A. C., an impedance network consisting of a plurality of parallel branches of like elements connected across said source, each of said branches consisting of a resistance and a reactance connected in series and having values selected to represent the horizontal and vertical distances from said point to a portion of a gravitational anomaly, current responsive means connected to said network to indicate the total current flowing therein and calibrated in terms of gravity.

2. Apparatus for determining the vertical component of gravity in an area due to the presence of a known gravitational anomaly which is arbitrarily divided into a plurality of elementary volumes, comprising a source of alternating current, means for controlling the frequency of said alternating current, an impedance network consisting of a plurality of parallel branches respectively corresponding to the elementary volumes, a resistor and a capacitor connected in series in each of said branches, said resistor having a value proportional to the horizontal distance from a preselected point in said area to the corresponding elementary volume and the capacitor being adjustable in accordance with the depth of the extremities of said mapping point from a preselected plane to said corresponding volume, rectifier means connected through each of said impedance branches to said source, and current responsive means connected in common to all of said rectifier means to indicate the total current flow in said impedance network as a measurement of the vertical component of gravity due to said anomaly at this point.

3. For use in determining a component at a plurality of mapping points on a plane of the gravitational attraction of a subsurface geological anomaly, the combination comprising a plurality of resistors, each resistor having a first and second end connection, means for connecting the first end connection of each of said plurality of resistors to a source of alternating current, a first plurality of electrical contacts respectively connected to the second terminals of the plurality of resistors, said contacts being spaced at preselected regular intervals, the resistance of each resistor being proportional to the distance between the corresponding contact and a datum contact selected from among said first plurality of contacts, a second plurality of contacts, a plurality of reactors attached respectively to each of said second plurality of contacts, a meter connected in series with each of said reactors, means for connecting said meter to a source of alternating current, said second plurality of contacts being movable relative to said first plurality of contacts and said reactors being variable to correspond to the upper and lower boundaries of the geological anomaly, said meter being calibrated to indicate the gravitational attraction of said geological anomaly at the mapping points on said plane corresponding to the positions of said datum contact relative to the second plurality of contacts.

4. Apparatus for determining the vertical component of gravity in an area due to the presence of a known gravitational anomaly which is arbitrarily divided into a plurality of elementary volumes, comprising a source of alternating current, a network consisting of a plurality of parallel branches respectively corresponding to the elementary volumes, each branch consisting of a resistor and a variable reactor connected in series in each of said branches, said resistor having a resistive value which is a function of the horizontal distance from a preselected point in said area to the corresponding elementary volume, current responsive means connected in series with said plurality of parallel branches and said source of alternating current to indicate the total current flow in said network as a measurement of the vertical component of gravity due to said anomaly at said point.

5. In combination, a datum electrical contact, a first plurality of regularly-spaced electrical contacts, a resistor connected between said datum contact and each of said regularly-spaced contacts and having a resistive value proportional to the distance between said datum contact and said regularly-spaced contact, a second plurality of electrical contacts having the same spacing as said first plurality of contacts, variable reactance means connected to each of said second electrical contacts, means for generating an alternating current, a pair of terminals on said last-named means, means for measuring an alternating current, means connecting one terminal of said means for generating said current through said means for measuring said current and said reactance means to said second plurality of contacts, means connecting the other terminal to said datum contact, and means for placing said first plurality of contacts in contact with said second plurality of contacts.

6. Apparatus for determining the vertical component of gravity at a mapping point adjacent to a gravitational anomaly which has been arbitrarily divided into elementary prisms, comprising a source of alternating current, means for controlling the frequency of said alternating current, an impedance comprising a plurality of parallel branches representing the elementary prisms into which the known gravitational anomaly has been divided connected to said source, each of said branches comprising a resistor and a capacitor connected in series, said resistor having a value selected in accordance with the horizontal distance from said mapping point to the axis of an elementary prism and said capacitor having a value selected in accordance with the depth from the plane of said mapping point to said prism, rectifier means connected to each of said impedance network branches and current responsive means connected in common to all of said rectifier means to indicate the total current flow in said impedance network as a measurement of the vertical component of gravity at said mapping point.

References Cited in the file of this patent

UNITED STATES PATENTS

| | | |
|---|---|---|
| 2,067,444 | Gewertz | Jan. 12, 1937 |
| 2,523,453 | Starr | Sept. 26, 1950 |

OTHER REFERENCES

Mechanical Engineers Handbook, L. S. Marks, third edition, 1930, McGraw-Hill, New York; page 1946 relied upon.